(12) United States Patent
Mau et al.

(10) Patent No.: US 7,433,105 B2
(45) Date of Patent: Oct. 7, 2008

(54) DECORATIVE FILM, CARTON, AND METHOD OF MAKING

(75) Inventors: Christine Marie Mau, Neenah, WI (US); Duane Lyle McDonald, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 117 days.

(21) Appl. No.: 10/374,185

(22) Filed: Feb. 25, 2003

(65) Prior Publication Data

US 2004/0166258 A1    Aug. 26, 2004

(51) Int. Cl.
*G02B 5/32* (2006.01)
*G02B 3/08* (2006.01)

(52) U.S. Cl. .................. 359/15; 359/742; 428/142
(58) Field of Classification Search ................. 359/463, 359/742, 831, 619, 457, 833, 834, 630, 565, 359/15; 434/365, 96; 428/172, 142, 412; 40/743; 353/66, 98, 38; 362/346; 430/1
See application file for complete search history.

(56) References Cited

U.S. PATENT DOCUMENTS

| | | | |
|---|---|---|---|
| 2,486,636 A | 11/1949 | Egle | |
| 2,499,452 A * | 3/1950 | Bonnet | 359/628 |
| 3,357,772 A | 12/1967 | Rowland | |
| 3,762,809 A * | 10/1973 | Kato et al. | 353/66 |
| 3,908,056 A * | 9/1975 | Anderson | 428/142 |
| 3,961,575 A | 6/1976 | Rodabaugh | |
| 4,138,517 A | 2/1979 | Gardner | |
| 4,159,677 A | 7/1979 | Smith | |
| 4,386,123 A | 5/1983 | Coburn, Jr. | |
| 4,427,733 A | 1/1984 | Poll et al. | |
| 5,109,767 A | 5/1992 | Nyfeler et al. | |
| 5,156,863 A | 10/1992 | Pricone et al. | |
| 5,500,311 A * | 3/1996 | King et al. | 430/1 |
| 5,695,346 A * | 12/1997 | Sekiguchi et al. | 434/365 |
| 5,733,634 A | 3/1998 | Karel | |
| 5,856,661 A | 1/1999 | Finkelstein et al. | |
| 6,344,281 B1 | 2/2002 | Smith et al. | |
| 6,346,318 B1 | 2/2002 | Panchyshyn | |
| D459,221 S | 6/2002 | Springer et al. | |
| 2004/0182917 A1 | 9/2004 | Watson | |

FOREIGN PATENT DOCUMENTS

| | | |
|---|---|---|
| DE | 1 257 043 | 1/1969 |
| DE | 100 36 073 A1 | 2/2002 |
| EP | 0 458 508 A | 11/1991 |
| FR | 2 826 130 A | 12/2002 |
| GB | 1131038 | 10/1968 |
| GB | 1 528 927 | 10/1978 |
| GB | 1528927 * | 10/1978 |
| GB | 1528927 A * | 10/1978 |
| WO | WO 03/107042 A | 12/2003 |

(Continued)

OTHER PUBLICATIONS

"Fresnel Lenses," Internet web page, "http://www.fresneltech.com/pdf/FresnelLenses.pdf", Fresnel Technologies Inc., Fort Worth, Texas, 2001, pp. 1-12.
Exhibit A—1 photograph of "Merry Christmas 2002" Table Tent showing a table tent and insertable "Merry Christmas 2002" paper disc, Rapisardi Intellectual Property, Milano, Italy, Dec. 2002.
Exhibit B—1 photograph of "Merry Christmas 2002" Table Tent showing a table tent with the "Merry Christmas 2002" paper disc inserted in place in the table tent, Rapisardi Intellectual Property, Milano, Italy, Dec. 2002.
Exhibit C—Sample of a tissue carton having prismatic sidewalls.

* cited by examiner

*Primary Examiner*—Audrey Y Chang
(74) *Attorney, Agent, or Firm*—Gregory E. Croft

(57) ABSTRACT

A film having a Fresnel lens is placed adjacent a design to create a three-dimensional image. The film can be used separately or laminated to a substrate to create enclosures such as cartons, dispensers, or containers.

14 Claims, 10 Drawing Sheets

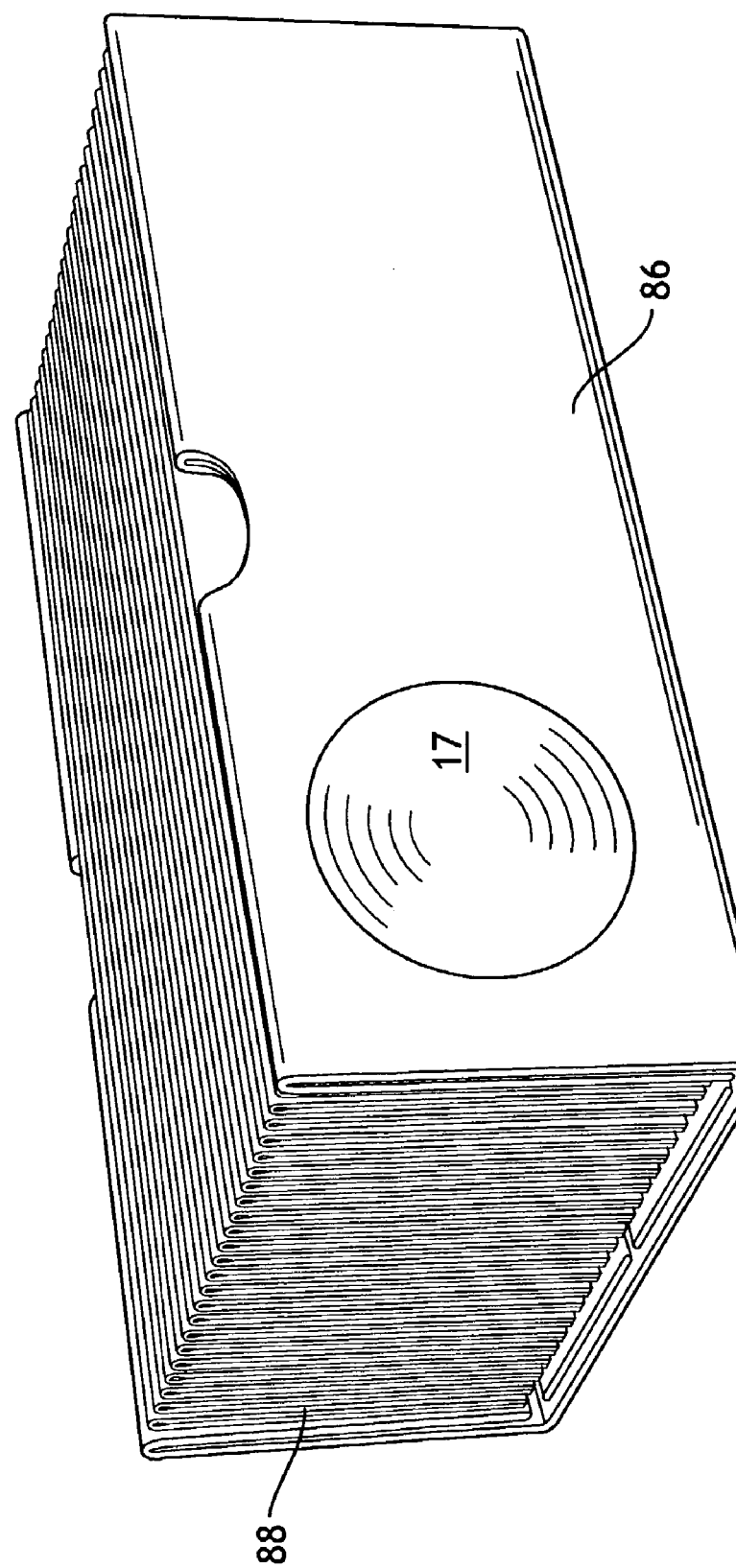

DECORATIVE FILM, CARTON, AND METHOD OF MAKING

BACKGROUND

Prismatic materials that capture and reflect light in different directions are known to convey the appearance of depth or three-dimensions on a flat surface. Prismatic materials are useful for a wide variety of applications such as decorative films, wrapping paper, packaging, and containers.

One example of a prismatic material is a Fresnel lens, which can be created in a film layer, and the resulting film metallized or backed by light reflecting material. Such materials can produce an image of a ball or globe appearing to have three-dimensions. Prismatic material of this type is available as a repeating Fresnel lens pattern film laminate under the trademark Multi-Lens™ by Coburn Corporation, Lakewood, N.J. A tissue carton utilizing this material is disclosed in U.S. Pat. No. D459,221 entitled Tissue Carton Having Prismatic Sidewalls issued to Springer et al. on Jun. 25, 2002, and herein incorporated by reference in a consistent manner.

Another example of a prismatic material is a star-shaped Fresnel lens produced by cutting a conventional Fresnel lens into multiple pieces and then rearranging the pieces to create a star. The star-shaped Fresnel lens can be created in a film layer and metallized by suitable methods to produce a film having the appearance of three-dimensional stars. The material, containers using the material, and a method of producing the material is disclosed in U.S. patent application Ser. No. 10/172,758 entitled Multilens Star Box and Method for Making Same filed by Gerald Keberlein on Jun. 14, 2002, and herein incorporated by reference in a consistent manner.

The previous uses of metallized Fresnel lens films in making cartons and containers relied on the unique look of the metallized Fresnel lens film when applied to the packaging. In particular, the Fresnel lens's optical properties were not exploited in conjunction with printing of the lens containing film or substrates to further the three-dimensional effect on the viewer. Previous printing of films having Fresnel lenses was done without registering the printed indicia to the position of the Fresnel lens within the film. In addition, the printing was opaque such that any portion of a Fresnel lens that happened to be printed upon was intentionally obscured by the printing process.

SUMMARY OF THE INVENTION

The inventor has discovered that by controlling the printing and location of a design in conjunction with using a Fresnel lens, at least a portion of the design can appear to be three-dimensional. The design can be placed adjacent to the Fresnel lens either above it or below it in different embodiments. In one embodiment, the design will appear as part of a three-dimensional ball or globe produced by the Fresnel lens. To create the illusion of a snow globe, the metallized film can contain a plurality of holographic snowflakes and the design can be a winter scene. The resulting effect is similar to ornamental articles commonly referred to as "snow globes." Snow globes comprise a figurine or scene within a globe having a liquid media and a particulate media that is often white. When the snow globe is shaken, an illusion of a snow storm is created inside of the globe.

Hence, in one aspect, the invention resides in an article comprising a film having a Fresnel lens, a design adjacent one of the Fresnel lens's surfaces, and wherein at least a portion of the design appears three-dimensional.

In another aspect, the invention resides in an article comprising a film having a Fresnel lens and a holographic pattern, a design adjacent one of the Fresnel lens's surfaces, and wherein at least a portion of the design appears three-dimensional.

BRIEF DESCRIPTION OF THE DRAWINGS

The patent or application file contains at least one drawing executed in color. Copies of this patent or patent application publication with color drawing(s) will be provided by the U.S. Patent and Trademark Office upon request and payment of the necessary fee.

The above aspects and other features, aspects, and advantages of the present invention are apparent from the following detailed description, appended claims, and accompanying drawings in which:

FIG. 7 illustrates a napkin dispenser.

DEFINITIONS

As used herein "design" means a graphical representation, ornamental pattern, artistic work, picture, sculpture, or embossing. For the purposes of this application, a design does not encompass a solid unvarying color of the same hue, brightness, and saturation.

As used herein "three-dimensional" means having or appearing to have extension in depth.

As used herein "embossed" includes substrates having either raised portions (embossing) or depressed portions (debossing) or a combination of both raised and depressed portions.

DETAILED DESCRIPTION

Figure 1A:
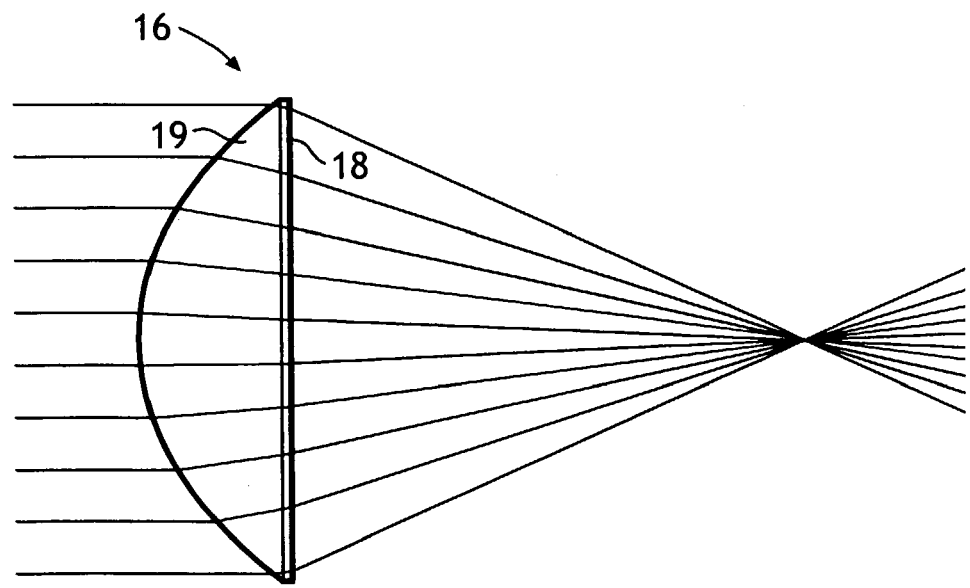
FIG. 1A illustrates a cross-section of an aspheric conventional lens.
Figure 1B:
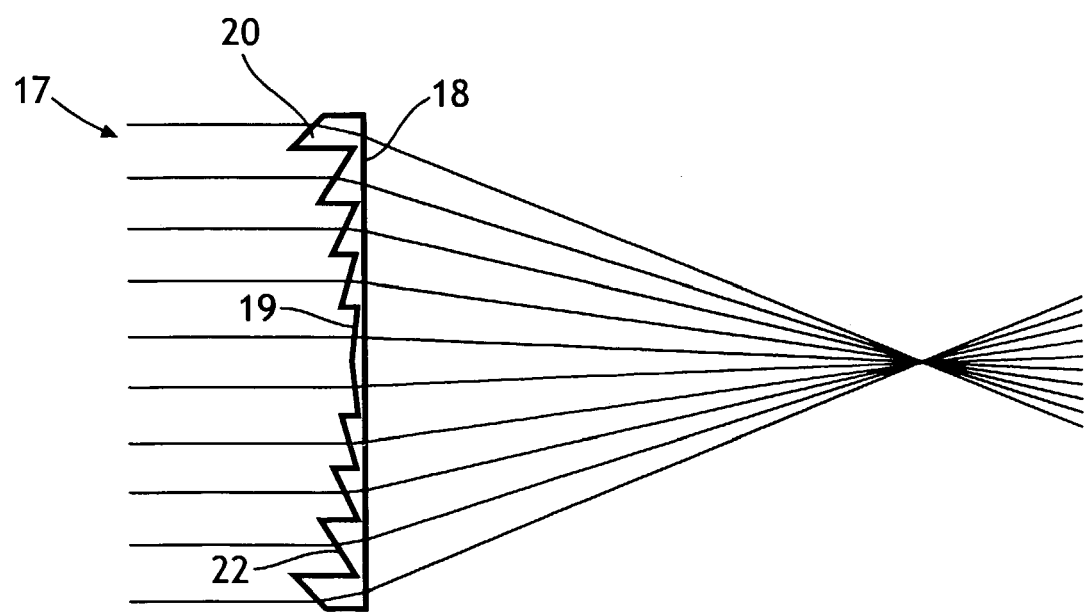
FIG. 1B illustrates a cross-section of a Fresnel lens.

FIGS. 1A and 1B illustrate cross-sections of an aspheric conventional lens 16 and a Fresnel lens 17 having the same focal length. In general, positive focal length Fresnel lenses are almost universally planoconvex having a flat surface 18 and a jagged convex surface 19 as illustrated. A positive focal length Fresnel lens transforms the thicker aspheric lens into a much thinner lens having the same optical properties. In a Fresnel lens, the bulk of the material is reduced by the extraction of multiple coaxial annular cylinders 20 of material. The contour of the aspheric lens's convex surface 19 is thus approximated by right circular cylindrical portions intersected by conical portions having inclined surfaces 22. The inclined surfaces feel like multiple grooves when running your fingernail across the jagged convex surface 19. The height of the cylinders 20 do not contribute to the lens's optical properties enabling Fresnel lenses to be made extremely thin compared to the same focal length a spheric lens. Near the center of a positive focal length Fresnel lens, the inclined surfaces 22 are nearly parallel to the flat surface 18; toward the outer edge the inclined surfaces become extremely steep, especially for lenses of low f-number. The inclined surface 22 of each groove is the corresponding portion of the original a spheric surface, translated toward the flat surface 18 of the lens. The angle of each inclined surface is modified slightly from that of the original aspheric profile to compensate for the translation. The result is the jagged convex surface 19 illustrated in FIG. 1B. More information about Fresnel lenses and their optical properties can be found in the publication entitled Fresnel Lenses published by Fresnel Technologies Inc., having an office at 101 West Morningside Drive, Fort Worth, Tex. 76110.

Figure 2:
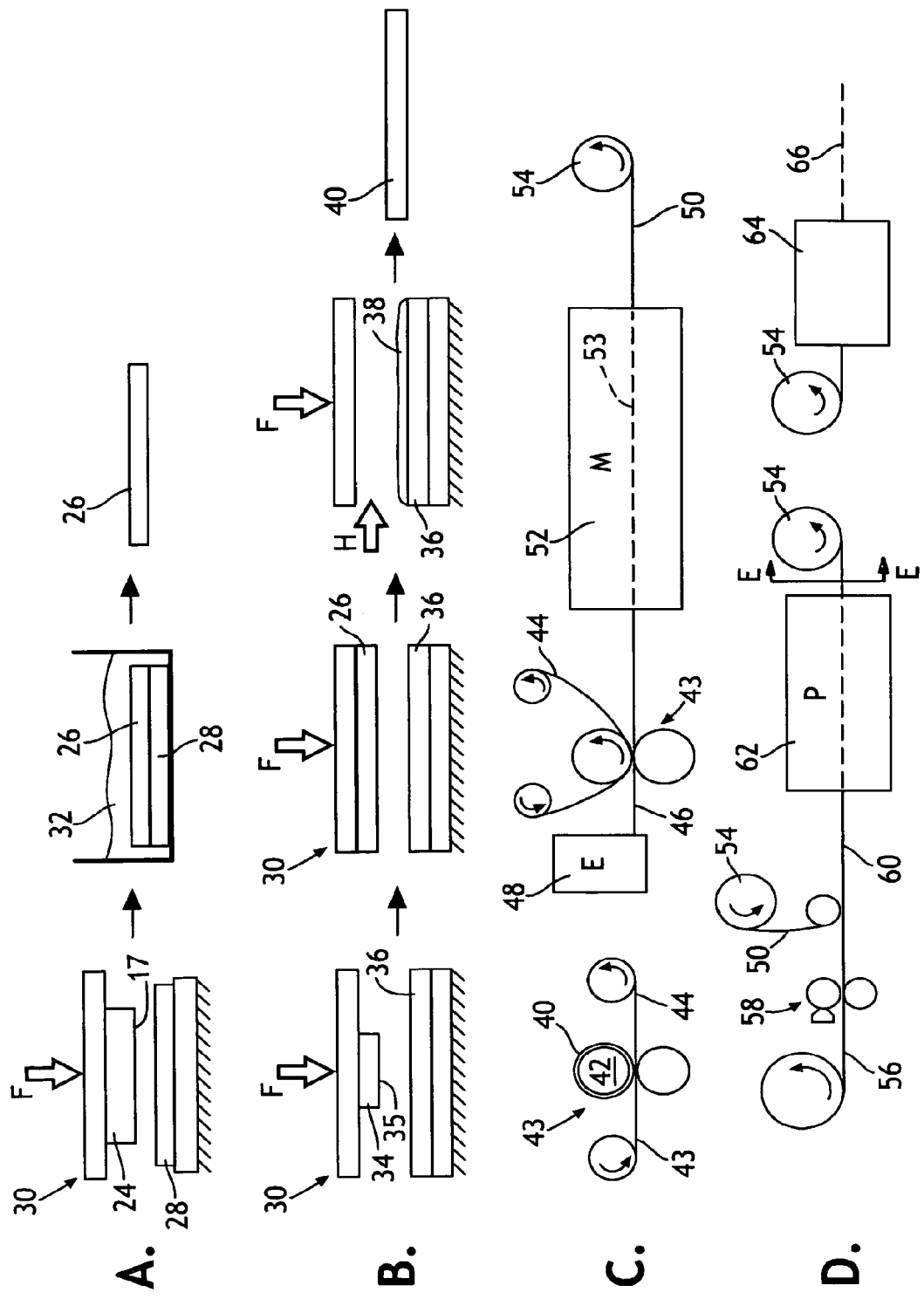
FIGS. 2A-2E illustrates a process for producing films, laminates, and cartons containing a Fresnel lens.
Figure 2E:
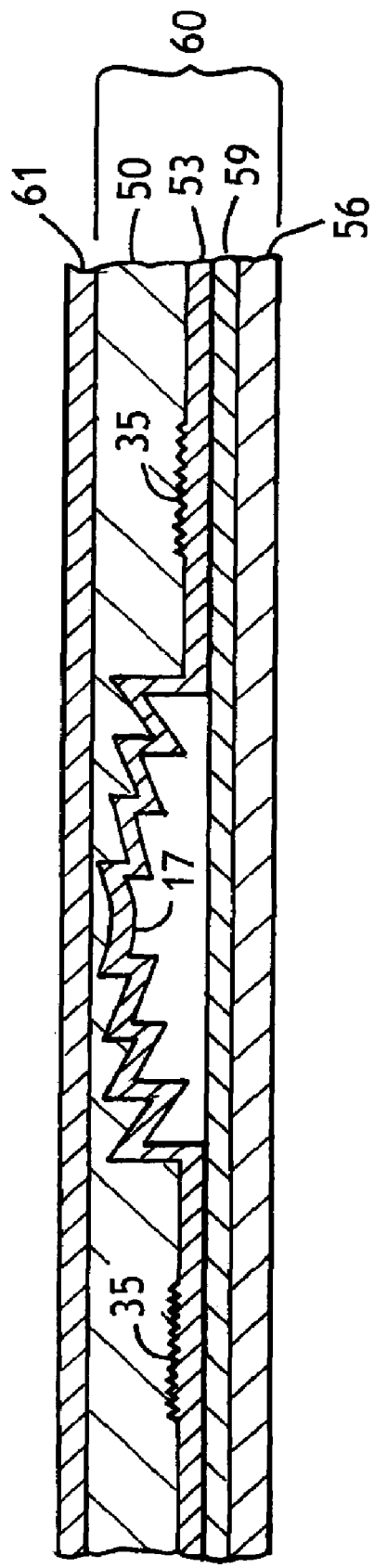

Referring to FIG. 2, one possible method for producing a film and a carton having a Fresnel lens is illustrated. A brass die 24 for the Fresnel lens is created on a machine lathe where the proper angles for the inclined surfaces 22 are cut into the face of the die as a plurality of grooves by a machine tool. Other suitable materials can be employed for the die such as iron, steel, copper, or metal alloys. The grooves are cut at varying angles, e.g., $\theta_x$, $\theta_y$, $\theta_z$, from each other such that each inclined surface 22 will refract light rays to a common focal point as illustrated in FIG. 1. The grooves are cut to a depth of between 0.001 mils (0.000001 inches) to about 0.5 mils (0.0005 inches), and more specifically, to a depth of about 0.005 mils (0.000005 inches). One company having the ability to make such a die is RPM Optoelectronics, having an office at 1724 Corby Avenue, Santa Rosa, Calif. 95407.

Referring specifically to FIG. 2A, the die 24 can be used in a press 30 to make a nickel plate 26. The nickel plate 26 is formed, for instance, by first embossing a substrate or first film 28 by the die 24 and then immersing the first film 28 in a nickel bath. The first film 28, a plastic web for example, is shown being stamped by the die 24 in which the Fresnel lens pattern resides, embossing the Fresnel lens pattern into the first film 28. The first film 28 may be a polymer, a plastic, a thermoplastic, a rubber or the like. If plastic is used as the first film 28, the plastic is from between 0.15 inches to about 0.5 inches in thickness.

The die 24 used to emboss the first film 28 can be heated to about 130° Fahrenheit to aid in the pattern transfer. The heated die 24 is then pressed into the first film 28, which acts as a carrier of the Fresnel lens pattern. Alternatively, the first film 28 may also be heated and stamped with a die 24 that is at ambient temperature or is also heated.

Once the first film 28 has been embossed with the die 24, it is then chemically treated to assist in plating and inserted into a metal electroplating bath 32. This bath 32 may be, for instance, a nickel (Ni) bath, which is electrically charged. It should be noted that other processes such as electroless plating processes are suitable to form the metal plate 26. The chemically treated first film 28 and the nickel bath grow the nickel into the embossing over a 6 to 12 hour period, for instance, depending on the desired thickness of the nickel plate 26. An embossed surface of the nickel plate 26 is usually 1 mil (0.001 inches) to 3 mils (0.003 inches) thick. Following the desired period, the nickel plate 26 and the first film 28 are removed from the bath 32. The nickel plate 26 is peeled away from the first film 28 and is cleaned by washing. The nickel plate 26 is suitable for producing additional Fresnel lens patterns without risking damage to the die.

Referring now to FIG. 2B, a second nickel plate 34 having a holographic pattern 35 can be embossed into a second film 36 with the press 30. Following processes known to those of skill in the art, a laser can be used to create the holographic pattern on a glass plate. Similar to the process used to make the nickel plate 26, the glass plate can be used to create a second nickel plate 34 having the holographic pattern. The depth of the embossment, temperature, and pressure are controlled during the pressing when embossing the holographic pattern into the second film 36. In one embodiment, the holographic pattern was a snowflake, and the pattern was repeated over the entire surface of the second film 36. In another embodiment, only the Fresnel lens pattern was used without a holographic image.

After the holographic pattern is placed onto the second film 36, the press 30 is used to emboss the nickel plate 26 having the Fresnel lens pattern onto the second film 36. During pressing of the nickel plate 26, the depth of the embossment, temperature and pressure are controlled such that in areas where the Fresnel lens appears the holographic snowflake pattern is "erased". The erasing occurs since the holographic pattern is embossed into the second film 36 to a lesser depth than the Fresnel lens pattern. As such, in areas where the Fresnel lens is placed, the pre-existing holographic pattern is molded again and re-embossed to a deeper depth with the Fresnel lens pattern. After both patterns are placed onto the second film 36, a polymer 38 is placed over the surface of the second film 36. Heat (H) and force (F) are applied to transform the polymer 38 into a master shim 40 having both patterns on one of its surfaces. One company having the ability to create a master shim as described is HoloReel LLC/Holman Technology, Inc., having an office at 5B Marlen Drive, South Gold Industrial Park, Hamilton, N.J. 08691.

Referring now to FIG. 2C, the master shim 40 can be applied to an embossing roll 42 of an embosser and a third film 43 can be embossed with the master shim 40 to make one or more master belt(s) 44 having both a repeating Fresnel Lens pattern and a repeating holographic snowflake pattern over their length. One company having the ability to create a master belt as described is Coburn Graphic Films, Inc., having an office at 1650 Corporate Road West, Lakewood, N.J. 08701.

A fourth film 46 is made, for example, by an extruder 48 using plastic pellets. If desired, the fourth film 46 may be colored to a desired color during the extrusion step to provide a color aspect to the fourth film 46 or the film may be made without coloring. The extruded fourth film 46 is then run through an embosser (43) with the master belt 44 and embossed by the master belt producing a repeating holographic snowflake pattern and Fresnel lens pattern in the fourth film. The patterned fourth film 46 then can continue into a metallizing chamber 52 in which a metal 53 such as aluminum is vacuum deposited on the side of the fourth film 46 having the convex surface 19 with inclined surfaces 22. Alternatively, the flat surface 18 of the Fresnel lens can be metallized. As known in the art, a spark from a welding type of apparatus vaporizes aluminum rods or aluminum wire in the chamber 52 such that the aluminum migrates to the fourth film 46 and metallizes the film to form a metallized film 50.

The fourth film 46 is typically 2 mils (0.002 inches) to about 4 mils (0.004 inches) thick. The fourth film 46 can be made of various polymers; such as polyvinyl chloride (PVC), polyesters, or polyolefins; or plastics, thermoplastics, rubber, or the like. Likewise, the metal utilized for vacuum deposition is typically aluminum, although tin, zinc, and other metals may also be used. Once the metallized film 50 is produced, it can be wound and stored as a roll 54 for future use. The metallized film can be used directly for a number of purposes such as wrapping paper or can be combined with other substrates. The metallized film 50 can be used to cover any number of products such as packages, beverage containers, picture frames, walls, surfaces, books or other items on which a metallized plastic film 50 can be adhered to. One company having the ability to extrude and create the metallized film as described is Coburn Graphic Films, Inc., having an office at 1650 Corporate Road West, Lakewood, N.J. 08701.

Referring now to FIG. 2D, a substrate 56, suitable for making cartons, containers, or bags can be unwound and adhesively coated by a coater 58. Suitable substrates can include paper, wood, cardboard, foil, metal, plastic, or films. In one embodiment, the substrate 56 was a carton board that was combined with the metallized film 50 to produce a laminate 60 by adhering with adhesive 59 the metallized surface of the film 50 to the board. If desired, the exterior surface may be coated to improve the printing quality. One company having the ability to laminate and coat the film for printing is HoloReel LLC/Holman Technology, Inc., having an office at 5B Marlen Drive, South Gold Industrial Park, Hamilton, N.J. 08691.

The laminate 60 is then printed with ink 61 by a suitable printing process 62 (P) such as an offset, flexographic, or gravure printing methods and rewound into a roll 54. The printing process may have multiple printer stations for printing multiple colors. More details of the printing process P will be described later. One company having the ability to print the laminate 60 is VirtualColor having an office at 1530 Morse Avenue, Elk Grove, Ill. 60007. After printing, the roll of printed laminate 60 can be unwound and processed by a carton former 64 into individual cartons 66 suitable for containing tissue products and being filled by high speed converting equipment. Alternatively, the laminate can be produced in sheets, the sheets printed, and then die cut into individual carton blanks. One company having the ability to produce cartons is Smurfit/Stone Container Corporation having an office at 400 E. North Avenue, Carol Stream, Ill., 60188.

Figure 3A:
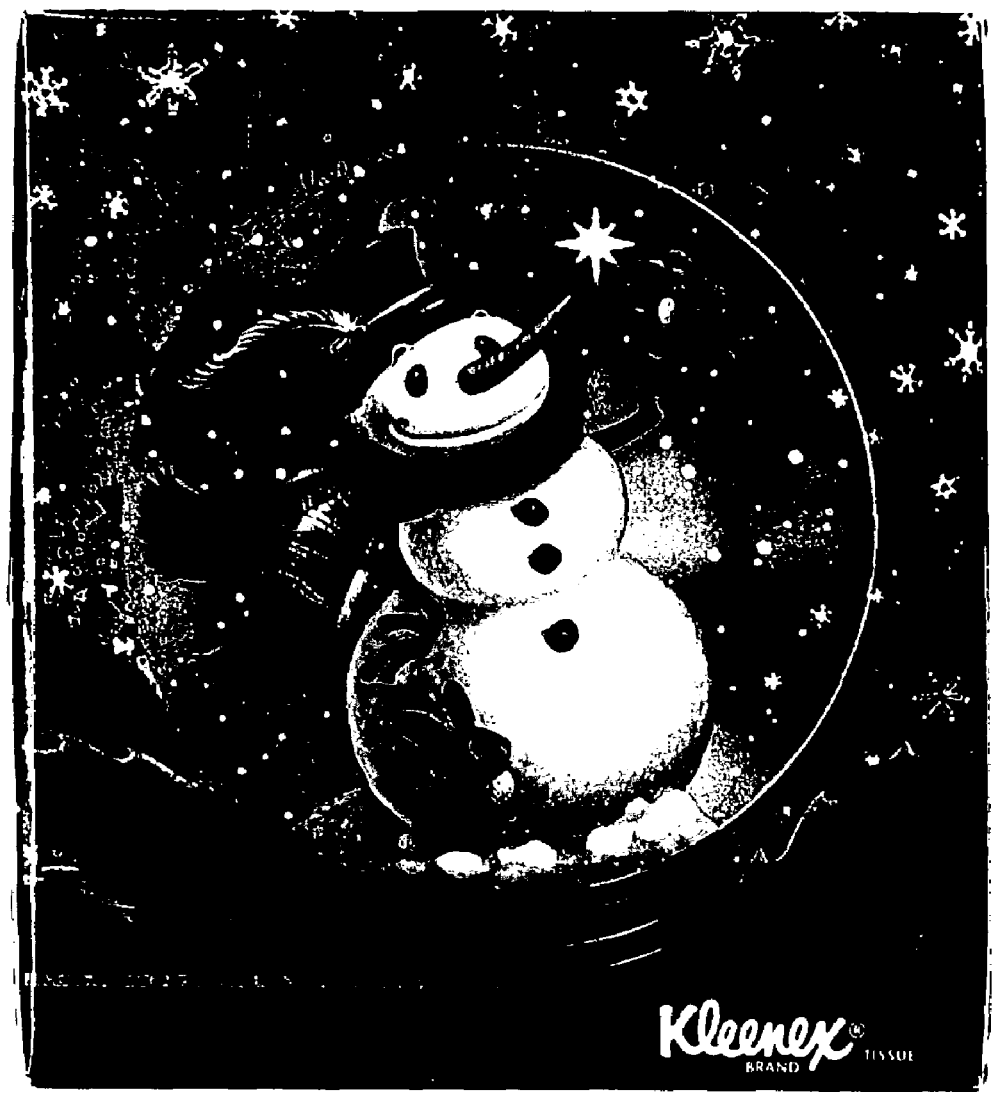
FIG. 3A illustrates a color photograph of a substrate having a three-dimensional image produced by a Fresnel lens.
Figure 3B:
FIG. 3B illustrates another color photograph of the substrate of FIG. 3A.

Referring now to FIGS. 3A and 3B, color photographs of the laminate 60 printed with a design 68 are presented. The design illustrates a snowman wearing a hat and a scarf holding a bird in one hand with a rabbit sitting on the ground next to the snowman all contained within a globe. The globe is surrounded by holographic snowflakes that have been printed with a transparent red color. The globe resides on a base surrounded by bows of holly and pine branches. As seen, the photo appears three-dimensional and gives the illusion of a snowman in a snow globe.

The illustrated design depicts a winter scene, but any suitable design can be used with the three-dimensional effect produced by the Fresnel lens. For instance, the effect could be used to give the illusion of gold fish in a fish bowl. Another use for the effect could be to depict flowers such as a sunflower, to depict planets such as Saturn, to depict insects such as a ladybug, or to depict eyes such as exaggerated monster eyes.

The printing of the design 68 is registered to the position of the Fresnel lens and manipulated to provide the illusion that the snowman printed onto the flat surface 18 of the Fresnel lens resides instead within the globe. The entire globe is actually the Fresnel lens having its convex surface 19 metallized. The three-dimensional effect closely resembles an actual snow globe as previously described. By printing a design 68 onto the flat surface 18 and by having at least a portion of the design transparent or semi-transparent, the viewer will see at least a portion of the three-dimensional globe produced by the metallized Fresnel lens through the transparent portions of the design. Thus, to the viewer the design appears three-dimensional as if it is a real snow globe.

While not wishing to be bound by theory, it is believed the three-dimensional effect occurs because light striking the Fresnel lens is reflected by the metallized convex surface 19 of the lens, creating a three-dimensional globe shape that appears to be located well beneath the flat surface 19 of the lens. The metallized Fresnel lens reflects light and objects such that by tilting and moving the metallized film, it is possible to see images reflected in the three-dimensional globe similar to reflected images seen in a mirror.

Referring to FIG. 3A, light reflected by the metallized Fresnel lens highlights areas of the design including the scarf, the hat, and the middle of the snowman. It appears as if three light rays are streaming out from a light source located behind the snowman. Looking closely at the snowman's arm holding the bird, one of the light rays appears to have a circular arc, which is caused by the three-dimensional globe produced by the metallized Fresnel lens.

Referring to FIG. 3B, the laminate has been moved relative to the actual light source. The previously discussed highlights have shifted such that only the hat and base of the snowman now appear highlighted. The snowman's arm and scarf appear against a dark background. While the photo in FIG. 3B appears much darker, the actual lighting was the same. The change in appearance is due to the way the light is reflected by the metallized Fresnel lens.

In the preceding discussion, the convex surface 19 of the Fresnel lens was metallized and the design 68 was printed adjacent or onto the flat surface 18 creating the three-dimensional effect. It is also possible to metallize the flat surface and print on the convex surface 19, but the quality of the printing would be less, resulting from the surface irregularities of the jagged convex surface.

Figure 4:
FIG. 4 illustrates a negative for the design in FIG. 3.

Referring now to FIG. 4, a negative of the snowman design, representing transparent and opaque regions of the design 68 is illustrated. Opaque areas 70 within the design, such as the snowman, are solid black in the figure. Transparent areas 72 are solid white in the figure, and semi-transparent areas 74, such as the snowman's scarf, are various shades of grey. To control the transparency in the final printed design, the opaque areas are printed twice at a 100 percent coverage with white by two different stations on a printing press using a 150 line AM screen printing process. The transparent areas receive no printing with a white base color. The semi-transparent areas receive one or two printings with white at intermediate levels less than 100 percent using a mezzotint screen. The mezzotint screen allows the white dots to be tapered off to zero percent coverage without leaving a distinct visible line. In an alternative embodiment (not shown), portions of the snowman can be semi-transparent such as the face near the eyes and nose, and the middle and lower body areas around the charcoal buttons. Leaving portions of the snowman semi-transparent, in addition to the scarf, can enhance the three-dimensionality of the design under certain lighting conditions.

Once the pre-printing with white is accomplished, the design 68 is printed by a six color (cyan, magenta, yellow, black, orange, and green) printing process in a conventional manner as known to those of skill in the art. Alternatively, a five or a four color printing process can be used. Additional printing techniques are disclosed in U.S. Pat. No. 5,733,634 entitled Printing Process With Highlighted Color And Appearance Of Depth issued to Norman Karel on Mar. 31, 1998, and herein incorporated by reference in a consistent manner. At least a portion of the final printed design can be transparent to give the design a three-dimensional effect when viewed.

Figure 5:
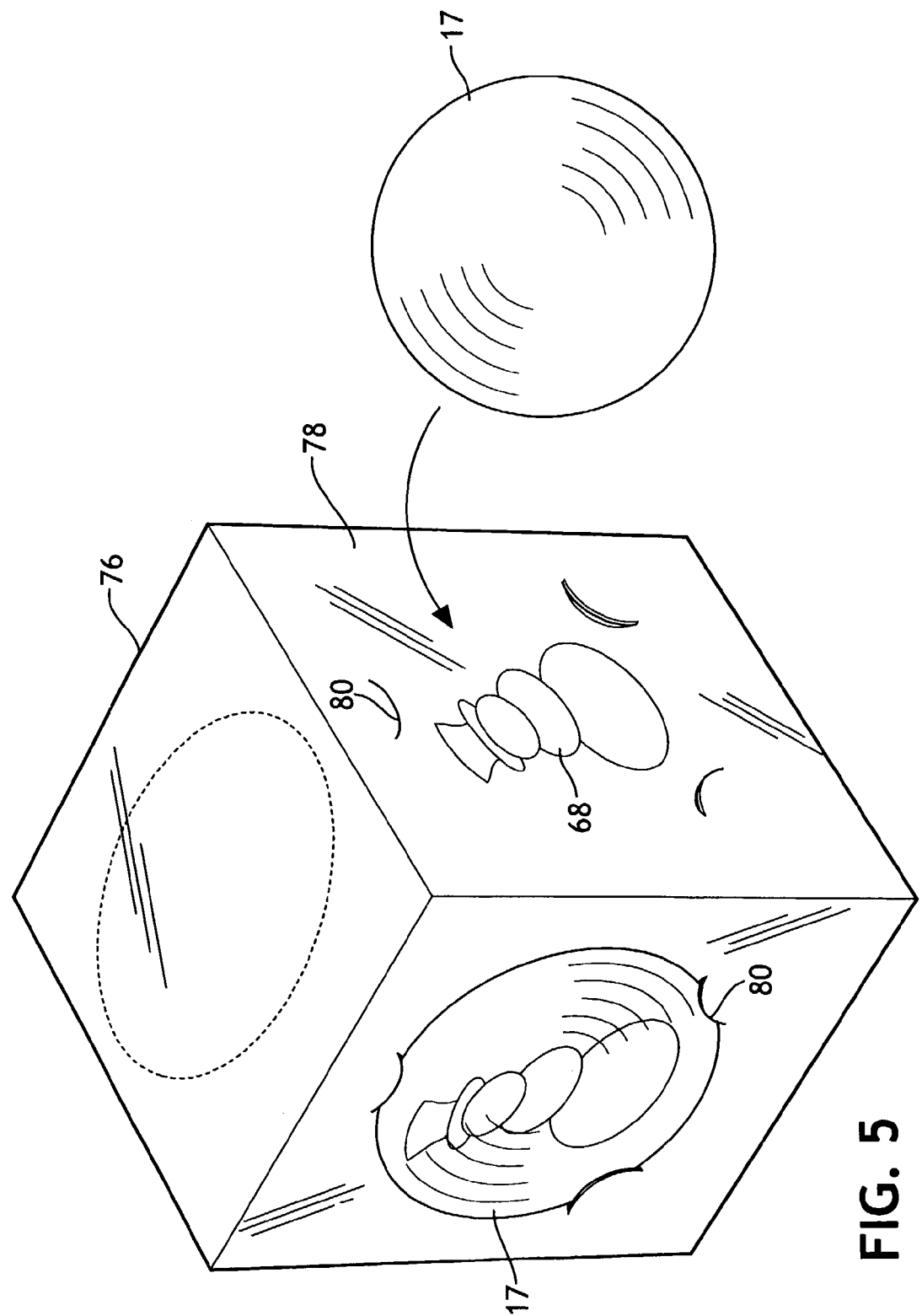
FIG. 5 illustrates an enclosure.

Referring now to FIG. 5, an enclosure 76 having an exterior surface 78 is illustrated. In one embodiment, the enclosure was a carton containing tissues. In alternative embodiments, the enclosure can be a bag, a box, a container, a can, a package, a table tent, or a dispenser, such as a U-shaped napkin dispenser. The enclosure can be formed from the laminate 60 or the metallized film 50 with a printed design resulting in enclosures having three-dimensional designs. Alternatively, the enclosure can have three-dimensional designs from utilizing a transparent Fresnel lens, which will be discussed next.

It is possible to leave the Fresnel lens transparent, without being metallized, while creating a three-dimensional appearance for the design. Referring again to FIG. 5, the design 68 (simplified to show only a simplified snowman) can be printed onto the exterior surface 78 of the substrate 56, forming the enclosure 76. The substrate can be a paper, a board, a film or a plastic, or it can be a laminate of a board layer and a film layer. In one embodiment, the substrate was a metallized film having holographic snowflakes laminated to a board stock. Alternatively, the laminate can have an unprinted exterior surface and instead have the design reverse printed to the film's interior surface prior to laminating the film to the board.

The exterior surface 78 can have a plurality of clips 80 cut through the substrate for holding the Fresnel lens 17 in place. The Fresnel lens is placed adjacent to and over the printed design 68 on the substrate 56 and secured in place by the clips as illustrated. After placement of the Fresnel lens over the design 68, the design will appear three-dimensional from the Fresnel lens's optical properties. In this instance, the snowman will appear as if inside of a globe (the Fresnel lens) since the design is printed behind the circular Fresnel lens. The viewer will not see the three-dimensional ball produced when the Fresnel lens is metallized (FIG. 3); instead, the viewer will see reflected light from the lens's surfaces (18, 19) above the snowman creating the illusion. To soften the image, the thin Fresnel lens can be shaped convex or concave by the clips resulting in a Fresnel lens with spherical aberration since it no longer has a flat surface 18 and the inclined surfaces 22 are no longer properly angled to eliminate the spherical aberration. In such a case, portions of the design can be made to appear softer and fuzzy, rather than in sharp focus, as a result of the aberration. Alternatively, the inclined surfaces 22 can be machined at angles which produce the desired amount of spherical aberration while the Fresnel lens remains flat.

Instead of the clips 80, glue, adhesive, or tape can be used to secure the Fresnel lens to the exterior surface 78. The glue can be applied along the perimeter of the lens and colored to blend into or contrast with the design 68 or selected to be transparent. Alternatively, the glue can be applied in a pattern beneath the Fresnel lens and either blend with or contrast with the design while securing the lens. Either the flat 18 or the convex surface 19 of the Fresnel lens, depending on the desired effect, can be placed adjacent to the design 68. If desired, the transparent Fresnel lens can be replaced with the metallized Fresnel lens previously described, having a printed design or even a uniform color from the film without any additional printing. The metallized Fresnel lens can be removed from the clips 80 and used as a Christmas tree ornament. Envision cutting the circular globe from FIG. 3, and either placing it on the enclosure 76 or hanging it as an ornament.

Figure 6:
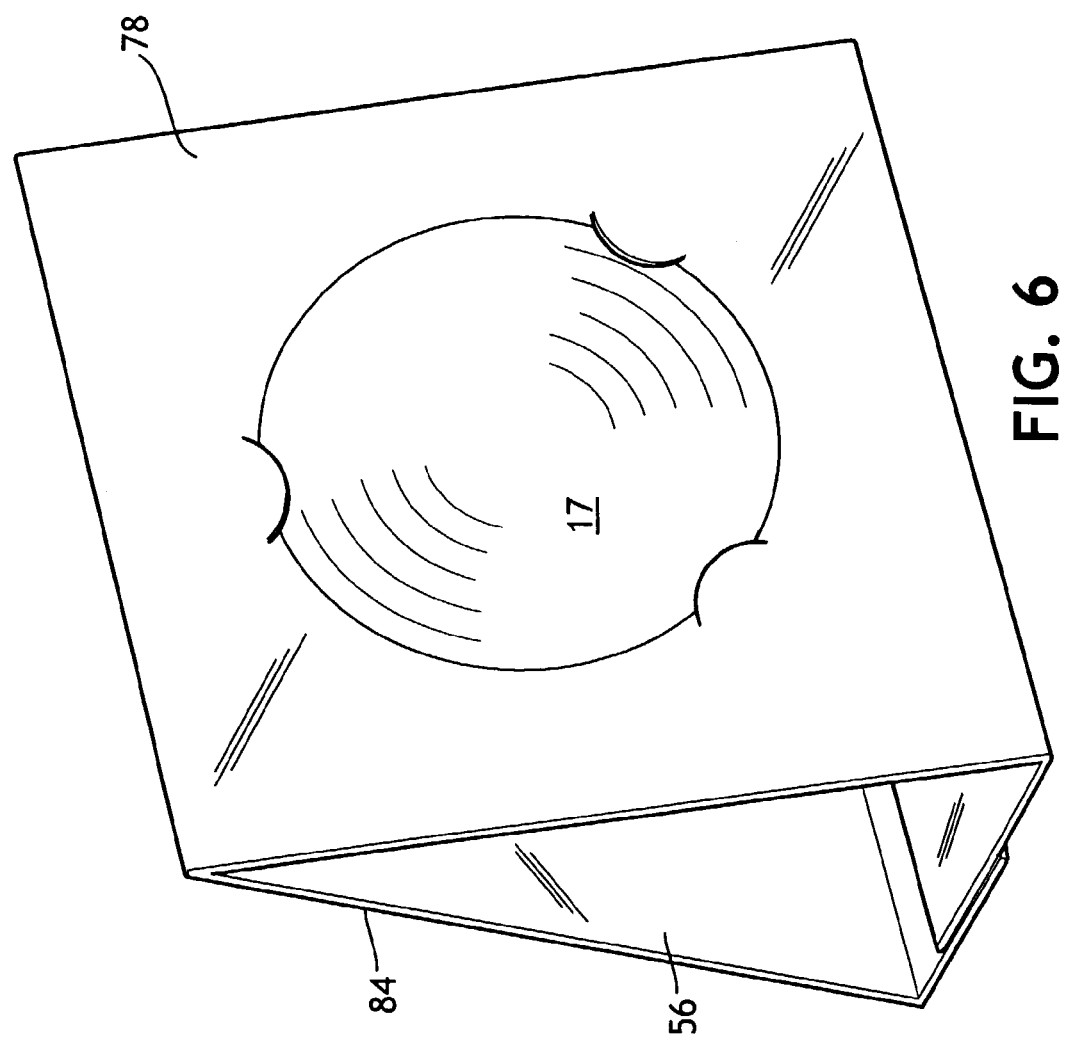
FIG. 6 illustrates a table tent.

Referring now to FIGS. 6 and 7, additional enclosures having a three-dimensional design are illustrated. For simplicity, the design 68 has been eliminated and only the Fresnel lens 17 is illustrated. As discussed, the design 68 can either be printed onto the Fresnel lens or the substrate beneath the Fresnel lens. In FIG. 6 the substrate 56 is folded into a triangle producing a table tent 84. The exterior surface 78 can be printed with useful information in addition to the design adjacent the Fresnel lens. In FIG. 7, a napkin dispenser 86 is illustrated holding a plurality of folded paper napkins 88 with a design adjacent the Fresnel lens 17 on the exterior surface 78. In one embodiment, the napkin dispenser was constructed as disclosed in U.S. patent application Ser. No. 10/025,384 entitled Sheet Dispenser and Carton For Making A Sheet Dispenser filed by Gerald Keberlein on Dec. 19, 2001, and herein incorporated by reference in a consistent manner.

Figure 8A:
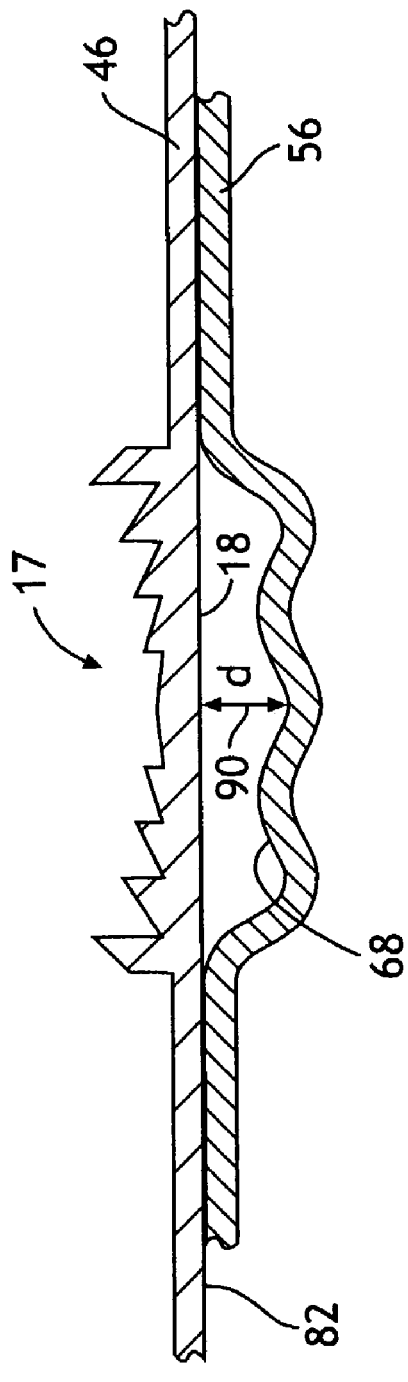
FIG. 8A illustrates a cross-section of one embodiment.

Referring now to FIG. 8A, another method for enhancing the three-dimensional effect of the design is illustrated in cross-section. The transparent Fresnel lens 17 produced in the fourth film 46, as previously described, is laminated to a substrate 56, such as carton board, another film, paper, plastics, or metal. The substrate is embossed and the Fresnel lens is located adjacent to and above the embossment. A design 68 created by the embossing alone, or by printing a design onto the embossed surface, or by printing a design onto a smooth surface depression created by the embossing is present adjacent to and beneath the Fresnel lens. Since the Fresnel lens is spaced distally a distance d (90) from the design, the design can be magnified owing to the optical properties of the Fresnel lens resulting in another method to create a three-dimensional design. Alternatively, the entire design or portions of the design located outside of the embossed area can be printed by a reverse printing process onto the interior surface 82. By printing the design in a reverse image onto the interior surface, any glue or adhesive used to laminate the film and the substrate together can be hidden from view since the printed design, by virtue of being printed first, can hide adhesive placed onto the interior surface after printing. Additionally, selected portions of the interior surface 82 can be metallized after reverse printing to enhance the three-dimensional effect.

Figure 8B:
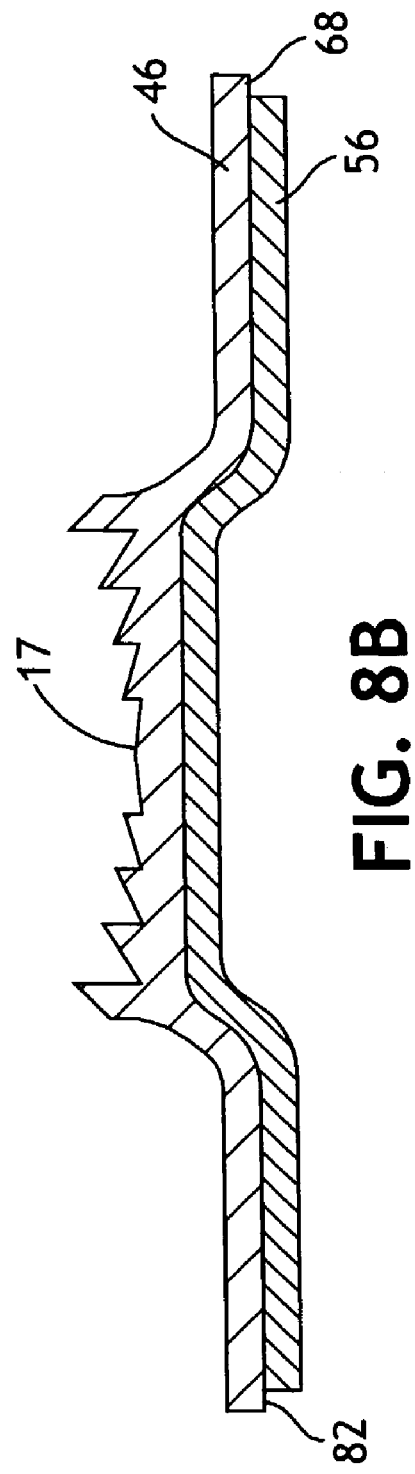
FIG. 8B illustrates a cross-section of another embodiment.

Alternatively, the substrate 56 and fourth film 46 can be embossed as shown in FIG. 8B with the Fresnel lens placed immediately adjacent the embossed area. If desired, all or portions of an interior surface 82 of fourth film 46 can be printed by a reverse printing with the design 68 prior to laminating the film to the substrate. Selected portions of the interior surface can be metallized after printing to enhance the three-dimensional effect. While the flat surface 19 of the Fresnel lens was placed adjacent to the substrate 56 in FIGS. 8A and 8B, it is possible to place the jagged convex surface 19 adjacent the substrate if desired.

In one embodiment of the invention, the Fresnel lens was circular. In another embodiment of the invention, the circular Fresnel lens had a diameter greater than about 1.5 inches. In another embodiment, the Fresnel lens had a diameter less than about 5 inches. In other embodiments, the Fresnel lens had a diameter from about 2 inches to about 4 inches and from about 3 inches to about 4 inches. Additionally, while the Fresnel lens in the preceeding examples had a circular perimeter, it is possible to cut the Fresnel lens into any alternative geometric shape such as a square, a triangle, or a star by way of example.

Alternative methods of creating the Fresnel lens are possible such as directly stamping the pattern into a suitable substrate using a die without creating a master shim as discussed. Thus, those of ordinary skill in the art will appreciate that the foregoing descriptions are by way of example only, and are not intended to limit the scope of the invention. It will be apparent to those skilled in the art that various modifications and variations can be made in the present invention without departing from the scope and spirit of the invention. For example, specific shapes, quantities, and arrangements of various elements of the illustrated embodiments may be altered to suit particular applications. Moreover, various embodiments may be interchanged either in whole or in part, and it is intended that the present invention include such modifications and variations as come within the scope of the appended claims and their equivalents.

We claim:

1. An article comprising:

an enclosure made from a laminate of an embossed film and a substrate, the film having at least one circular Fresnel lens comprising a flat surface on one side of the film and a convex surface comprising multiple coaxial annular cylinders and a repeating holographic pattern embossed into the other side of the film, the side of the film having the convex surface of the circular Fresnel lens being deposited with a metal to form a metallized surface; and a design printed onto the flat surface of the film and optically registered to the position of the at least one circular Fresnel lens, wherein the side of the film having the metallized convex surface of the at least one circular Fresnel lens is laminated to the substrate.

2. The article of claim 1 wherein at least a portion of the design is transparent.

3. The article of claim 1 wherein at least a portion of the design is opaque.

4. The article of claim 1 wherein the design comprises a transparent portion and an opaque portion.

5. The article of claim 4 wherein the opaque portion is first printed twice at 100 percent coverage of white and then printed with the design.

6. The article of claim 4 wherein the design depicts a snow globe.

7. The article of claim 1 wherein the enclosure comprises a carton containing tissues.

8. The article of claim 1 wherein the enclosure comprises a napkin dispenser holding a plurality of folded paper napkins.

9. The article of claim 1 wherein the design registered to the position of the at least one circular Fresnel lens depicts a snow globe and the separate repeating holographic pattern comprises snowflakes.

10. The article of claim 1 wherein the circular Fresnel lens has a diameter from about 2 inches to about 4 inches.

11. The article of claim 1 wherein the circular Fresnel lens is removably attached to the exterior surface of the enclosure by a plurality of clips cut into the exterior surface of the enclosure.

12. The article of claim 1 wherein the thickness of the film is between 0.002 inch and 0.004 inch.

13. The article of claim 1 wherein the substrate is paper, cardboard, or carton board.

14. The article of claim 1 wherein the Fresnel lens has a diameter greater than about 1.5 inches and less than about 5 inches and wherein the design comprises a printed figurine within a circular perimeter of the Fresnel lens.

* * * * *